United States Patent
Garbowicz et al.

(10) Patent No.: US 11,095,150 B2
(45) Date of Patent: *Aug. 17, 2021

(54) EMERGENCY DIMMING APPARATUS

(71) Applicant: Hubbell Incorporated, Shelton, CT (US)

(72) Inventors: Glenn D. Garbowicz, Algonquin, IL (US); Edvin G. Blanco, Aurora, IL (US); Michael W. Bandel, North Aurora, IL (US)

(73) Assignee: Hubbell Incorporated, Shelton, CT (US)

( * ) Notice: Subject to any disclaimer, the term of this patent is extended or adjusted under 35 U.S.C. 154(b) by 182 days.

This patent is subject to a terminal disclaimer.

(21) Appl. No.: 16/265,660

(22) Filed: Feb. 1, 2019

(65) Prior Publication Data
US 2019/0165604 A1 May 30, 2019

Related U.S. Application Data

(63) Continuation of application No. 15/094,021, filed on Apr. 8, 2016, now Pat. No. 10,199,862.

(60) Provisional application No. 62/148,590, filed on Apr. 16, 2015.

(51) Int. Cl.
*H02J 9/06* (2006.01)
*H05B 45/10* (2020.01)
*H05B 45/14* (2020.01)

(52) U.S. Cl.
CPC ............. *H02J 9/065* (2013.01); *H02J 9/061* (2013.01); *H05B 45/10* (2020.01); *H05B 45/14* (2020.01)

(58) Field of Classification Search
CPC .......... H02J 9/065; H02J 9/061; H05B 45/10; H05B 45/14
See application file for complete search history.

(56) References Cited

U.S. PATENT DOCUMENTS

| | | | |
|---|---|---|---|
| 6,252,385 B1 * | 6/2001 | Mellot | G05F 1/575 323/314 |
| 7,057,351 B2 | 6/2006 | Kuo | |
| 7,190,126 B1 * | 3/2007 | Paton | H05B 47/19 315/308 |
| 7,382,113 B2 | 6/2008 | Wai | |
| 7,501,768 B2 | 3/2009 | Lane | |
| 7,952,231 B1 | 5/2011 | Zansky | |
| 8,033,686 B2 | 10/2011 | Recker et al. | |
| 8,053,927 B2 | 11/2011 | Hjort | |

(Continued)

FOREIGN PATENT DOCUMENTS

WO 2013136242 9/2013

*Primary Examiner* — Pinping Sun
(74) *Attorney, Agent, or Firm* — Michael Best & Friedrich LLP

(57) ABSTRACT

An emergency dimming apparatus including a control input pass-through configured to receive a control signal, a control output configured to output the control signal to a driver, and a controller. The controller includes an electronic processor and a memory. The controller is configured to monitor a line voltage, determine if the line voltage has crossed a threshold, disconnect the control input pass-through when the line voltage has crossed the threshold, output an output voltage when the line voltage has crossed the threshold, and output an emergency control signal, via the control output, when the line voltage has crossed the threshold.

20 Claims, 3 Drawing Sheets

(56) References Cited

U.S. PATENT DOCUMENTS

| | | | |
|---|---|---|---|
| 8,148,948 B2 * | 4/2012 | Davis | H02J 9/002 |
| | | | 320/136 |
| 9,711,996 B2 | 7/2017 | Han | |
| 10,230,307 B2 * | 3/2019 | Chen | H05B 45/3575 |
| 10,348,105 B2 * | 7/2019 | Adaniya | H02H 5/10 |
| 2005/0006958 A1 | 1/2005 | Dubovsky | |
| 2010/0060189 A1 | 3/2010 | Stevens | |
| 2012/0187852 A1 | 7/2012 | Mandy | |
| 2013/0127362 A1 | 5/2013 | Trainor | |
| 2013/0147351 A1 | 6/2013 | Trainor et al. | |
| 2013/0334881 A1 | 12/2013 | Jones | |
| 2014/0051379 A1 | 2/2014 | Ganesh | |
| 2014/0125133 A1 | 5/2014 | Han et al. | |
| 2014/0132164 A1 | 5/2014 | Mcbryde | |
| 2014/0268458 A1 * | 9/2014 | Luciani | H02H 3/10 |
| | | | 361/86 |
| 2015/0008844 A1 | 1/2015 | Wilson | |
| 2015/0015076 A1 | 1/2015 | Park | |
| 2015/0048685 A1 | 2/2015 | Wilson | |
| 2015/0108896 A1 * | 4/2015 | Gordin | H02J 9/065 |
| | | | 315/86 |
| 2015/0116194 A1 * | 4/2015 | Matsui | G11C 19/28 |
| | | | 345/100 |
| 2016/0062383 A1 * | 3/2016 | Nagasawa | G01R 19/16566 |
| | | | 307/130 |

* cited by examiner

US 11,095,150 B2

EMERGENCY DIMMING APPARATUS

RELATED APPLICATIONS

The application claims priority to U.S. patent application Ser. No. 15/094,021, filed on Apr. 8, 2016, which claims priority to U.S. Provisional Application No. 62/148,590, filed Apr. 16, 2015, the entire contents of which are hereby incorporated.

FIELD

The present application relates to dimmers, or dimming systems, and more specifically, light-emitting diode (LED) dimming systems.

A commonly known LED dimming system includes a 0-10V dimming driver. 0-10V dimming drivers provide an output drive signal, typically a fixed current signal, and an approximately 1-9V control signal (e.g., a voltage signal) used to control the output drive signal which is usually delivered to one or more controlled lights, or lighting loads. In some embodiments the controlled lights are a plurality of LEDs, such as but not limited to an LED array. However, 0-10V dimming drivers may be used to control other varieties of lights as well, such as, but not limited to, fluorescent lights. The control signal varies from approximately 1V DC to approximately 9V DC. Often, the controlled lights are scaled so that when receiving approximately a 9V to 10V control signal the controlled lights operate at a maximum output, and when receiving approximately a 0V to 1V control signal, the controlled lights operate at a minimum output.

SUMMARY

Emergency lighting systems may be used during power failures to power the controlled lights (e.g., an LED load). Typically, emergency lighting systems sense a power failure and deliver power directly to the controlled lights, thus bypassing the driver (e.g., 0-10V dimming driver). Such a condition has the potential to damage the driver by creating relay switch transients that may be detrimental to the circuitry of the driver. Thus, typical emergency lighting systems require additional measures or devices, such as extra diodes, to prevent back feeding of the drivers. However, these extra diodes are unable to avoid the issue of incorrect forward output voltage and output current parameters, which may vary based on the type of load present from the controlled lights.

To overcome some of these limitations, a device consistent with one or more of the exemplary embodiments disclosed herein provides an emergency dimming apparatus. The emergency dimming apparatus including a control input pass-through configured to receive a control signal, a control output configured to output the control signal to a driver, and a controller. The controller includes an electronic processor and a memory. The controller is configured to monitor a line voltage, determine if the line voltage has crossed a threshold, disconnect the control input pass-through when the line voltage has crossed the threshold, output an output voltage when the line voltage has crossed the threshold, and output an emergency control signal, via the control output, when the line voltage has crossed the threshold.

In another exemplary embodiment the application provides a method of operating a light. The method includes monitoring, via a controller, a line voltage, and disconnecting a control input pass-through when the line voltage is below the threshold. The method further includes outputting an output voltage when the line voltage is below the threshold, and outputting an emergency control signal when the line voltage is below the threshold.

In yet another embodiment, the application provides a method of providing power to a 0-10V driver input and an appropriate signal to a 0-10V control when the AC power from the utility fails and when an energy storage power back-up takes over.

In yet another embodiment, the application provides a method of the required 0-10V control signal to be based upon the wattage rating of the driver such as to provide the required safety agency, (UL924) lumen output and back-up time.

Other aspects of the application will become apparent by consideration of the detailed description and accompanying drawings.

DETAILED DESCRIPTION

Before any embodiments of the application are explained in detail, it is to be understood that the application, and the devices and methods described herein, are not limited in their application to the details of construction and the arrangement of components set forth in the following description or illustrated in the attendant drawings. The devices and methods in this application are capable of other embodiments and of being practiced or of being carried out in various ways.

Figure 1:
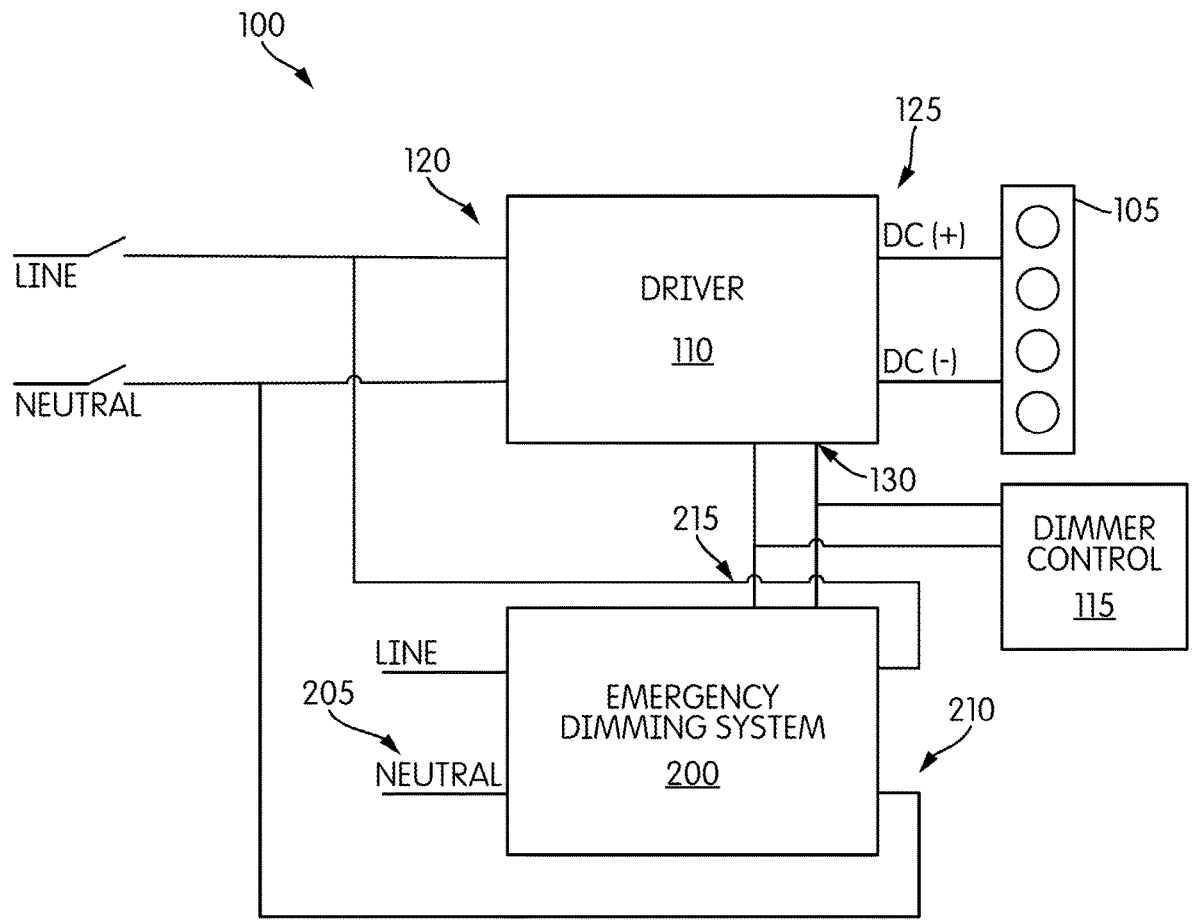
FIG. 1 is a block diagram of a dimming system in accordance with an exemplary embodiment of the present application.

FIG. 1 is a block diagram of a dimming system 100 according to one exemplary embodiment of the application. Dimming system 100 controls a lighting load 105. In some embodiments, the lighting load 105 includes one or more light-emitting diodes (LEDs), such as but not limited to an LED array. In other embodiments, the lighting load 105 may include any variety of lights, including but not limited to, fluorescent lights.

Dimming system 100 includes a driver 110, a dimmer switch, or dimmer control, 115, and an emergency dimming apparatus 200. The driver 110 includes a driver input 120, a driver output 125, and a control input 130. The driver 110 receives a line voltage, such as but not limited to an alternating-current (AC) voltage, at the driver input 120. As illustrated, the driver input 120 may include a line input and a neutral input. In some embodiments, the line voltage is approximately 120 VAC having a 50 Hz or 60 Hz frequency or, alternatively, approximately 277 VAC having a 50 Hz or 60 Hz frequency. In other embodiments, the line voltage is within a range of approximately 90 VAC to approximately 305 VAC.

The driver 110 receives a control signal at the control input 130 from the dimmer control 115. In some embodiments, the dimmer control 115 is a 0-10V controller such as, but not limited to, the Leviton IP710-DLZ. The driver 110 converts the line voltage, based on the control signal, to output a constant current at a specific voltage (e.g., a lighting voltage) consistent with the lighting load 105. The lighting voltage is output to the lighting load 105 via the driver output 125. In some embodiments, the lighting voltage at the required load constant current level is an output power level. In some embodiments, the driver 110 is an LED driver, such as but not limited to a 0-10V dimming driver, which may vary the output current in response to a control signal in a range of approximately 1 VDC to approximately 9 VDC. In such an embodiment, the lighting load 105 is scaled such that when receiving a first lighting voltage (based on a received control signal of approximately 9V to 10V) from the driver 110, the lighting load 105 operates at a first potential output (for example, but not limited to, the maximum potential output), and when receiving a second lighting voltage (based on a received control signal of approximately 0V to 1V) the lighting load 105 operates at a second potential output (for example, but not limited to, the minimum potential output. Additionally, in such an embodiment, when receiving a third lighting voltage, the lighting load 105 operates at a predetermined level between 0% and 100% of full potential output power based on the third lighting voltage. For example, if the third lighting voltage is approximately 2V, the lighting load 105 operates at approximately 20% of the potential output.

Figure 2:
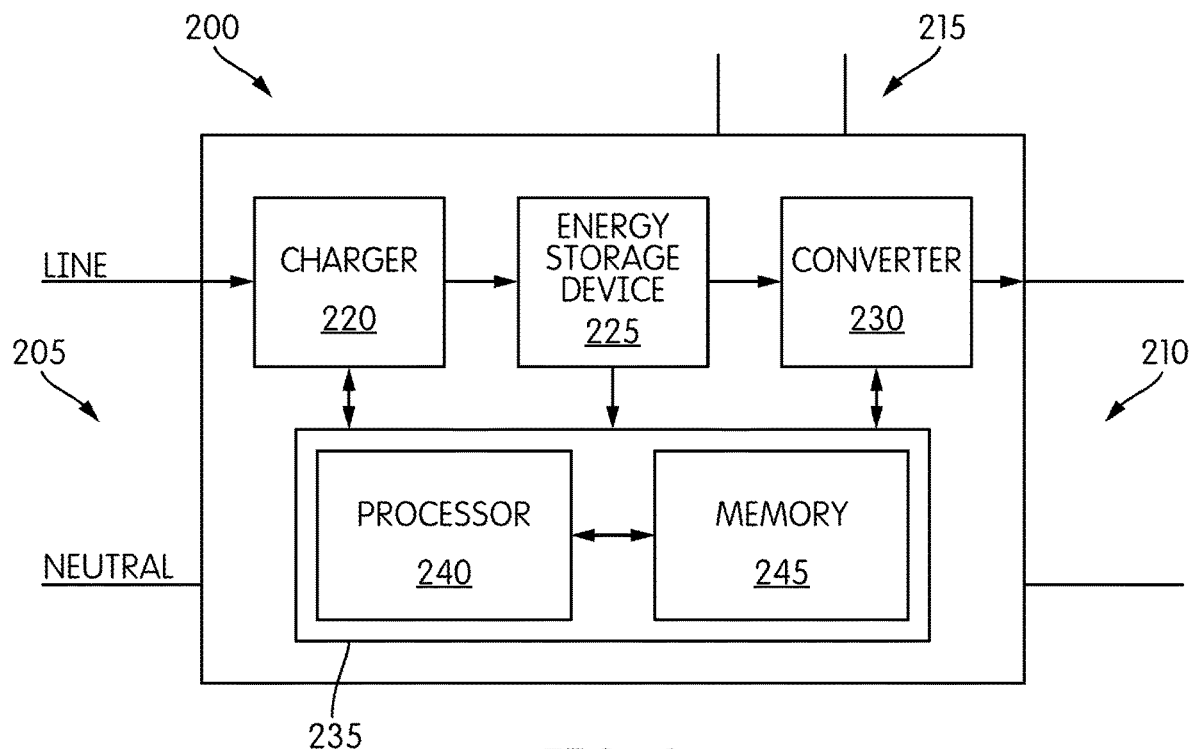
FIG. 2 is a block diagram illustrating an emergency dimming apparatus of the dimming system of FIG. 1.

FIG. 2 is a block diagram of the emergency dimming apparatus 200 according to one embodiment of the application. The emergency dimming apparatus 200 includes an input 205, an output 210, an emergency control output 215, a charger 220, an energy storage device 225, a power conversion device 230, and a controller 235. In the event of a power failure, the emergency dimming apparatus 200 provides power to the driver 110 (FIG. 1) as well as controls the constant current output of the driver 110 through the control output 215, which according to one or more exemplary embodiments includes one positive and one negative conductive lead. In some embodiments, the emergency dimming apparatus 200 provides a high-voltage direct-current (DC) power to the driver 110 (FIG. 1). In other embodiments, the emergency dimming apparatus 200 provides a high-voltage alternating-current (AC) power to the driver 110 (FIG. 1).

According to at least one embodiment, control output 215 interfaces with the 0-10V dimming control input of driver 110 (FIG. 1). When a power failure is determined, emergency dimming apparatus 200 drives the 0-10V dimming input to a level appropriate to achieve a desired light output from load 105. As the battery discharges to power the load via output 210, the control output 215 is controlled to maintain the light output from light load 105 at a fixed, or otherwise predetermined, level.

Emergency dimming apparatus 200 according to the embodiment shown receives the line voltage at input 205. In some embodiments, the emergency dimming apparatus 200 receives substantially the same line voltage as the driver 110. In other embodiments, emergency dimming apparatus 200 receives a different input (e.g., an input voltage from a different source other than the line voltage from power mains).

The input 205 provides the line voltage to the charger 220. The charger 220 converts the line voltage to a charging voltage (e.g., a DC-voltage). The charging voltage is then output to the energy storage device 225 in order to charge the energy storage device 225, or maintain the energy storage device 225 at a predetermined voltage (e.g., charge) level. In some embodiments, the energy storage device 225 is a rechargeable battery having one or more battery cells. In such an embodiment, the energy storage device 225 may have a chemistry such as but not limited to, lithium-ion, lead-acid, a nickel-cadmium, nickel metal hydride, and lithium-ion polymer. In another embodiment, the energy storage device 225 includes one or more capacitors, such as but not limited to, super-capacitors. The energy storage device 225 outputs a DC stored-voltage to the power conversion device 230.

The power conversion device 230 is a power converter configured to convert the DC stored-voltage received from the energy storage device 225 to an output voltage. The term "convert," "conversion," or "converter" herein may be used to broadly describe any type of known power conversions, including but not limited to, AC-to-DC rectification, DC-AC inversion, DC-to-DC conversion, and AC-to-AC conversion. In some embodiments, the DC stored-voltage is received when a failure of the AC input power line from the utility provider occurs. In some embodiments, the power conversion device 230 is a DC-DC converter configured to convert the DC stored-voltage to a high-DC output voltage. In such an embodiment, the high-DC voltage is within a range of approximately 160 VDC to approximately 220 VDC. In other embodiments, the power conversion device 230 is a DC-AC converter (inverter) configured to invert the DC stored-voltage to a high-AC output voltage. In such an embodiment, the high-AC voltage is within a range of approximately 100 VAC to approximately 300 VAC. The voltage (e.g., high-DC voltage or high-AC voltage) is output via the output 210.

Controller 235, according to the exemplary embodiment of emergency dimming apparatus 200 shown in FIG. 2 is electrically and/or communicatively coupled to the charger 220, the energy storage device 225, and the power conversion device 230, as well as additional components of the emergency dimming apparatus 200. The controller 235 may be configured to control and/or monitor the charger 220, the energy storage device 225, and the power conversion device 230, as well as additional components of the emergency dimming apparatus. Additionally, the controller 235 may be configured to output an emergency control signal from the emergency control output 215. In some embodiments, the emergency control signal can be programmed by a user so that the driver 110, when receiving the emergency control signal, operates the lighting load 105 at a set output potential, ranging from 0% to 100% output potential.

According to one or more exemplary embodiments, controller 235 includes a plurality of electrical and electronic components that provide power, operational control, and protection to the components and modules within the controller 235. For example, the controller 235 includes, among other things, a processor 240 (e.g., a microprocessor, a microcontroller, or another suitable programmable device), a memory 245, input units and output units. In some embodiments, the controller 235 is implemented partially or entirely on a semiconductor (e.g., a field-programmable gate array ["FPGA"] semiconductor) chip, such as a chip developed through a register transfer level ("RTL") design process.

The memory 245 includes, for example, a program storage area and a data storage area. The program storage area and the data storage area can include combinations of different types of memory 245, such as read-only memory 245 ("ROM"), random access memory 245 ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. The processor 240 is connected to the memory 245 and executes software instructions that are capable of being stored in a RAM of the memory (e.g., during execution), a ROM of the memory (e.g., on a generally permanent basis), or another non-transitory computer readable medium such as another memory or a disc. Software included in the implementation of the emergency dimming apparatus 200 can be stored in the memory 245 of the controller 235. The software includes, for example, firmware, one or more applications, program data, filters, rules, one or more program modules, and other executable instructions. The controller 235 is configured to retrieve from memory 245 and execute, among other things, instructions related to the control processes and methods described herein. In other constructions, the controller 235 includes additional, fewer, or different components.

In normal operation, the emergency dimming apparatus 200 receives and monitors the line voltage. During normal operation, the line voltage is used to charge, or maintain a charge on, the energy storage device 225 (via the charger 220). Additionally, during normal operation, no emergency control signal is output via the emergency control output 215.

In some embodiments, if the controller 235 senses that no line voltage is present at the input 205, the emergency dimming apparatus 200 enters power failure mode. In some embodiments, if the line voltage is below a threshold, the emergency dimming apparatus 200 enters power failure mode. In such an embodiment, the predetermined threshold may be within a range of approximately 90V to approximately 110V (e.g., approximately 108V).

During a power failure, the controller 235 controls the energy storage device 225 to output the DC stored-voltage to the power conversion device 230. In some embodiments, the controller 235 further controls the power conversion device 230 to convert the DC stored-voltage to the high-DC voltage. In other embodiments, the controller 235 further controls the power conversion device 230 to invert the DC stored-voltage to the high-AC voltage. The voltage (e.g., the high-DC voltage or the high-AC voltage) is then output, via the output 210, to the driver 110 at the driver input 120. Additionally, the controller 235 outputs the emergency control signal, via the emergency control output 215, to the driver 110 at the control signal input 130. The driver 110 receives the voltage (e.g., the high-DC voltage or the high-AC voltage) and the emergency control signal, and outputs a constant current to the lighting load 105 in a similar fashion as discussed above. After the controller 235 senses the line voltage is above the predetermined threshold, the emergency dimming apparatus 200 returns to normal operation.

Figure 3:
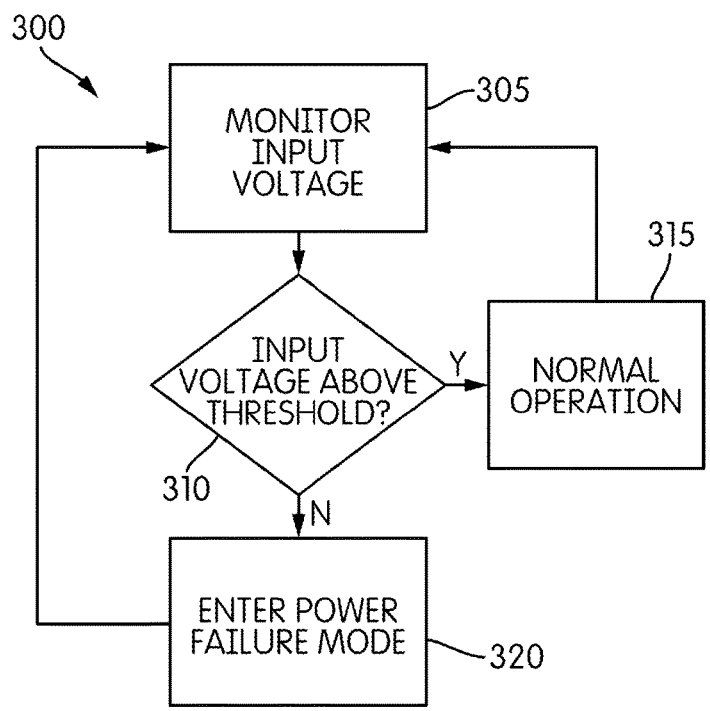
FIG. 3 is a flow chart illustrating a process of the emergency dimming apparatus of FIG. 2.

FIG. 3 is a flowchart illustrating a process 300 for operation of the emergency dimming apparatus 200. Process 300 begins with the controller 235 monitoring the line voltage at the input 205 (Step 305). The controller 235 determines if the line voltage is above the predetermined threshold (Step 310). If the line voltage is above the predetermined threshold, the emergency dimming apparatus 200 operates normally (Step 315) and then proceeds to Step 305. As discussed above, during normal operation, the emergency dimming apparatus 200 will use the line voltage to charge, or maintain charge, of the energy storage device 225. If the line voltage is below the predetermined threshold, the emergency dimming apparatus 200 enters power failure mode (Step 320). As discussed above, during power failure mode, the emergency dimming apparatus 200 will output the voltage (e.g., the high-DC voltage or the high-AC voltage) and emergency control signal to the driver 110. The process 300 will then proceed to Step 305.

Figure 4:
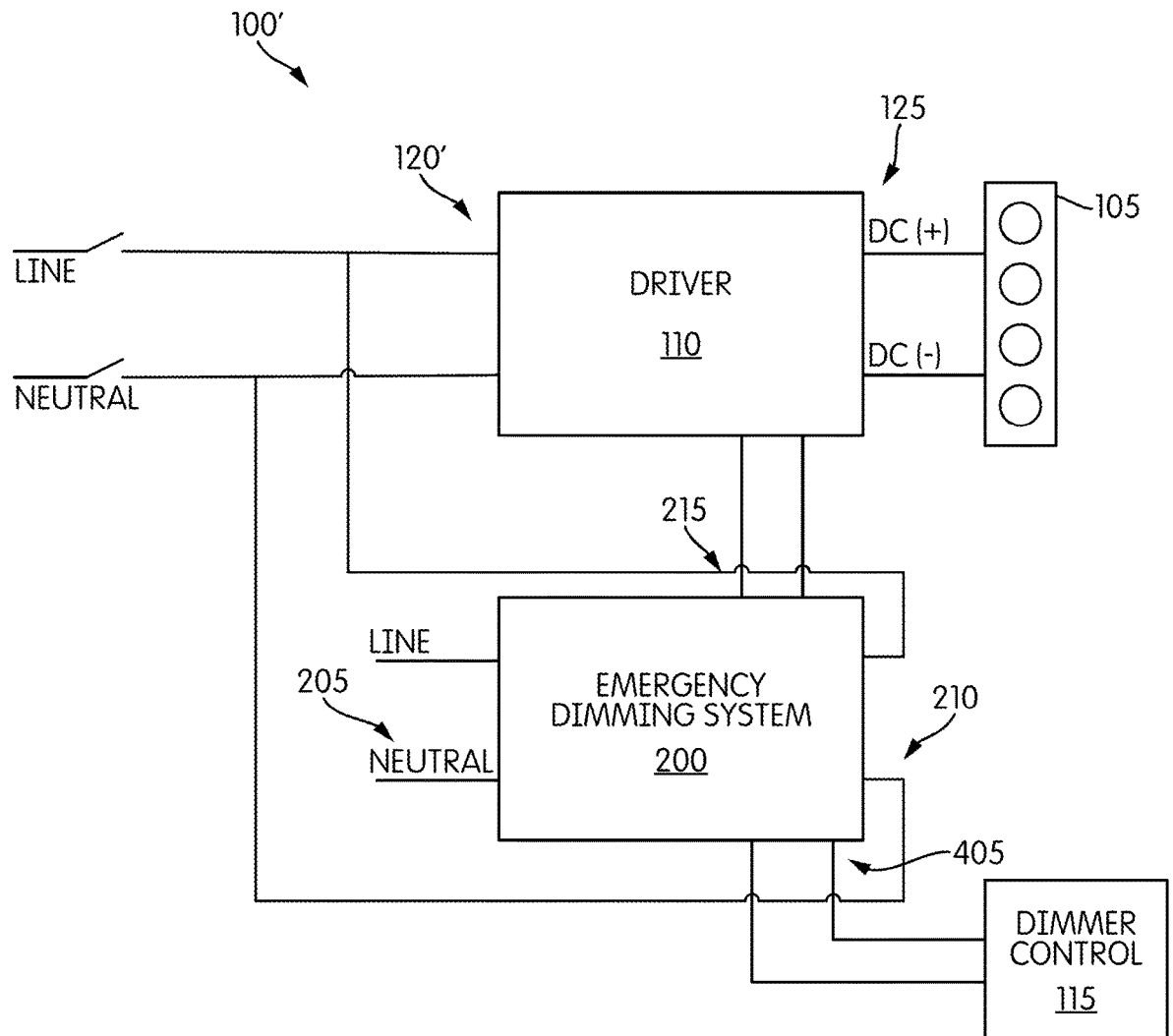
FIG. 4 is a block diagram of a dimming system in accordance with another embodiment of the present application.

FIG. 4 illustrates another embodiment of an emergency dimming apparatus 400 within a dimming system 100'. The dimming system 100' and the emergency dimming apparatus 400 may include substantially similar parts and components as the dimming system 100 and the emergency dimming apparatus 200. In some embodiments, the emergency dimming apparatus 400 further includes a control input pass-through 405. During normal operation, the emergency dimming apparatus 400 receives the control signal at the control input pass-through 405 and outputs the control signal at the emergency control output 215. The driver 110 receives the control signal and operates normally. During a power failure, the controller 235 will disconnect the control input pass-through 405 and output the emergency control signal at the emergency control output 215.

In some embodiments, the emergency dimming apparatus 200, 400 may further include a test button. When the test button is activated by a user, the emergency dimming apparatus 200, 400 enters a test mode. In some embodiments, the test mode is similar to the power failure mode, such that the emergency dimming apparatus 200, 400 will output the output voltage and the emergency control signal to the driver 110.

In some embodiments, the emergency dimming apparatus 200, 400 may further include one or more indicators, such as but not limited to, a battery state indicator. The battery state indicator may provide a condition (e.g., voltage level) of the energy storage device 225 to the user.

In some embodiments, the dimming systems 100, 100' may use wireless communication. In such an embodiment, the emergency dimming apparatuses 200, 400 may output the control signal and/or the emergency control signal wirelessly to the driver 110.

Thus, a device in accordance with embodiments disclosed in this application provides, among other things, an emergency dimming apparatus. The embodiments of the present application described above are configured to provide an appropriate electrical power for the proper light output required to qualify as an emergency light fixture. By providing power to the driver, that is already present in the fixture, the issue of load parameters is reduced. The present application provides a high-voltage, as well as an emergency control signal, to the driver. Thus, the present application provides dynamic control of the light output via the control input of the driver, in order to maintain a constant light output, even as the battery discharges (e.g., battery voltage decreases). Various features and advantages of embodiments of the devices disclosed in this application are set forth in the following claims.

What is claimed is:

1. An emergency dimming apparatus comprising:
 a control input pass-through configured to receive a control signal;
 a control output configured to output the control signal to a driver; and
 a controller including an electronic processor and a memory, the controller configured to
   monitor a line voltage,
   determine if the line voltage has crossed a threshold,
   disconnect the control input pass-through when the line voltage has crossed the threshold,
   output an output voltage when the line voltage has crossed the threshold, and output an emergency control signal, via the control output, when the line voltage has crossed the threshold.

2. The emergency dimming apparatus of claim 1, wherein the control signal is received via a user-control device.

3. The emergency dimming apparatus of claim 1, wherein the emergency control signal is output to the driver.

4. The emergency dimming apparatus of claim 1, further comprising an energy storage device.

5. The emergency dimming apparatus of claim 4, wherein the output voltage is output via the energy storage device.

6. The emergency dimming apparatus of claim 1, wherein the threshold is within a range of approximately 90 volts and approximately 110 volts.

7. The emergency dimming apparatus of claim 1, wherein the driver is a light-emitting diode (LED) driver.

8. The emergency dimming apparatus of claim 1, wherein the emergency control signal controls the driver to maintain a light output from a light load at a fixed level.

9. The emergency dimming apparatus of claim 1, wherein the output voltage is at least one selected from a group consisting of an alternating-current (AC) voltage and a direct-current (DC) voltage.

10. The emergency dimming apparatus of claim 9, wherein the DC voltage is within a range of approximately 160 VDC and approximately 220 VDC.

11. The emergency dimming apparatus of claim 9, wherein the AC voltage is within a range of approximately 100 VAC and approximately 300 VAC.

12. A method of operating a light, the method comprising:
monitoring, via a controller, a line voltage;
disconnecting a control input pass-through when the line voltage is below the threshold, wherein the control input pass-though is configured to receive a control signal and a control output is configured to output the control signal to a driver;
outputting an output voltage when the line voltage is below the threshold; and
outputting an emergency control signal, via the control output, when the line voltage is below the threshold.

13. The method of claim 12, wherein the control signal is received via a user-control device.

14. The method of claim 12, wherein the emergency control signal is output to the driver.

15. The method of claim 12, wherein the output voltage is output via an energy storage device.

16. The method of claim 12, wherein the threshold is within a range of approximately 90 volts and approximately 110 volts.

17. The method of claim 12, wherein the emergency control signal controls a driver to maintain a light output from a light load at a fixed level.

18. The method of claim 12, wherein the output voltage is at least one selected from the group consisting of an alternating-current (AC) voltage and a direct-current (DC) voltage.

19. The method of claim 18, wherein the DC voltage is within a range of approximately 160 VDC and approximately 220 VDC.

20. The method of claim 18, wherein the AC voltage is within a range of approximately 100 VAC and approximately 300 VAC.

* * * * *